United States Patent
Singh et al.

(10) Patent No.: US 11,361,112 B2
(45) Date of Patent: Jun. 14, 2022

(54) MANAGING SECURE DOCUMENT EXCHANGES

(71) Applicant: MASTERCARD INTERNATIONAL INCORPORATED, Purchase, NY (US)

(72) Inventors: Irina Singh, Chappaqua, NY (US); Marwazi Hilliza Siagian, White Plains, NY (US); Christopher H. Linder, White Plains, NY (US); Faizan Husain, Jersey City, NJ (US); Shanthan Subramaniam, Baldwin Place, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 15 days.

(21) Appl. No.: 16/922,262

(22) Filed: Jul. 7, 2020

(65) Prior Publication Data

US 2022/0012372 A1   Jan. 13, 2022

(51) Int. Cl.
| | |
|---|---|
| H04L 29/06 | (2006.01) |
| G06F 21/78 | (2013.01) |
| G06F 21/62 | (2013.01) |
| H04L 9/08 | (2006.01) |
| H04L 9/40 | (2022.01) |

(52) U.S. Cl.
CPC .......... G06F 21/78 (2013.01); G06F 21/6227 (2013.01); G06F 21/6272 (2013.01); H04L 9/083 (2013.01); H04L 63/102 (2013.01)

(58) Field of Classification Search
None
See application file for complete search history.

(56) References Cited

U.S. PATENT DOCUMENTS

| | | | |
|---|---|---|---|
| 7,058,605 B2 | 6/2006 | Gupta | |
| 7,661,146 B2 | 2/2010 | Karimzadeh et al. | |
| 7,725,582 B2 * | 5/2010 | Nadarajah | H04L 29/06 709/226 |

(Continued)

OTHER PUBLICATIONS

"Become a Digilocker Partner Organization", Retrieved Oct. 11, 2019, 5 pages, Retrieved from: https://partners.digitallocker.gov.in/.

(Continued)

*Primary Examiner* — Maung T Lwin
(74) *Attorney, Agent, or Firm* — Talem IP Law, LLP (57) ABSTRACT

A method for secure document exchange includes receiving a request from a content owner to initiate a document request of particular information from a record provider to a service provider; and sending the document request to the record provider. The document request sent to the record provider includes the particular information of the content owner as required by the service provider for the record provider to send to the service provider; contact information of the service provider to receive the particular information; and an encryption key with which the record provider is to encrypt the particular information before sending to the service provider The method further includes sending to the service provider a notification message that includes a decryption key with which to decrypt the particular information from the record provider.

20 Claims, 5 Drawing Sheets

(56) References Cited

U.S. PATENT DOCUMENTS

| | | | | |
|---|---|---|---|---|
| 7,849,306 | B2* | 12/2010 | Takeshima | H04L 67/02 713/153 |
| 7,962,380 | B2 | 6/2011 | Gary et al. | |
| 9,043,937 | B2 | 5/2015 | Jin et al. | |
| 9,621,357 | B2 | 4/2017 | Williams et al. | |
| 10,645,091 | B2* | 5/2020 | Hesselink | H04L 63/105 |
| 2003/0130867 | A1 | 7/2003 | Coelho et al. | |
| 2005/0071280 | A1* | 3/2005 | Irwin | H04L 63/065 705/59 |
| 2013/0031356 | A1* | 1/2013 | Prince | H04L 9/3268 713/151 |
| 2014/0122578 | A1* | 5/2014 | Lee | H04L 63/0281 709/203 |
| 2016/0156623 | A1* | 6/2016 | Liang | H04W 12/06 713/168 |
| 2019/0238525 | A1 | 8/2019 | Padmanabhan et al. | |

OTHER PUBLICATIONS

"Organize your child's health information", Retrieved Oct. 11, 2019, 6 pages, Retrieved from: https://cshcn.org/planning-record-keeping/care-organizer-for-parents/.

"HealthVault", Retrieved Oct. 11, 2019, 5 pages, Retrieved from: https://www.healthvault.com/en-us/healthvault-for-consumers/.

"Five things busy parents should know about the Parents Gateway app", Jan. 4, 2019, 10 pages, Retrieved from: https://www.tech.gov.sg/media/technews/five-things-busy-parents-should-know-about-the-parents-gateway-app.

"Cisco Webex Teams Security White Paper", Aug. 2018, 18 pages, Retrieved from: https://www.cisco.com/c/dam/en/us/td/docs/voice_ip_comm/cloudCollaboration/spark/esp/cisco-spark-security-white-paper.pdf.

* cited by examiner

MANAGING SECURE DOCUMENT EXCHANGES

BACKGROUND

File transfer can introduce a number of notable security vulnerabilities or possibilities for user error into an otherwise sound system. In some cases, file transfer can be used as part of a phishing scam by providing a fraudulent link to a site containing malware. Downloading untrusted documents can also carry with it the risk of downloading a malicious file instead of or in addition to an expected document. Even if proper channels are used, the process of sending a file, particularly a file with sensitive information, can expose the file to malicious users that are able to intercept it while outside of a secure environment.

File transfer can also introduce user error into a system. On a simple scale, an incorrect form or address can be included, causing the system to malfunction. Even if all information is entered and stored properly, in some cases mismanagement of consent—either simply not obtaining it or obtaining it for unintended information—can cause issues. For example, sending healthcare related information, such as physicals or lab results, without the proper consent from the patient, can result in legal liability in many locales.

BRIEF SUMMARY

Systems and methods for managing secure document exchanges are provided. Document security can be beneficial to parties requesting information, sending information, and receiving information. The described service can request, manage, and secure information requested by a content owner—without storing said information—to be sent by a record provider to a service provider. Extra steps for authentication and security can be added to provide custom levels of security for different requests.

A method for secure document exchange can begin with receiving a request from a content owner to initiate a document request. A request for documentation can be sent to a record provider, the request including at least: particular information for the record provider to send to a service provider, contact information of the service provider to receive the particular information, and an encryption key with which to encrypt particular information, including documents. A notification message can also be sent to the service provider. The notification message can include at least a decryption key with which to decrypt the particular information from the record provider.

Confirmation can be received from the service provider that the documentation was received from the record provider. After the confirmation from the service provider that the documentation was received from the record provider, a notification can be sent to the content owner indicating that the documentation was received by the service provider from the record provider.

The method can include an optional step for managing consent for use of information between the record provider and content owner. A request can be received by the secure document exchange service from the record provider for explicit consent of the content owner. A consent request can be initiated between the document exchange service and the content owner. The document exchange service can utilize identity authentication services such as available for payment transactions to authenticate the consent. After receiving explicit consent from the content owner, the explicit consent can be sent to the record provider.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Systems and methods for managing secure document exchanges are provided. Document security can be beneficial to parties requesting information, sending information, and receiving information. The described service can request, manage, and secure information requested by a content owner—without storing said information—to be sent by a record provider to a service provider. Extra steps for authentication and security can be added to provide custom levels of security for different requests.

Figure 1:
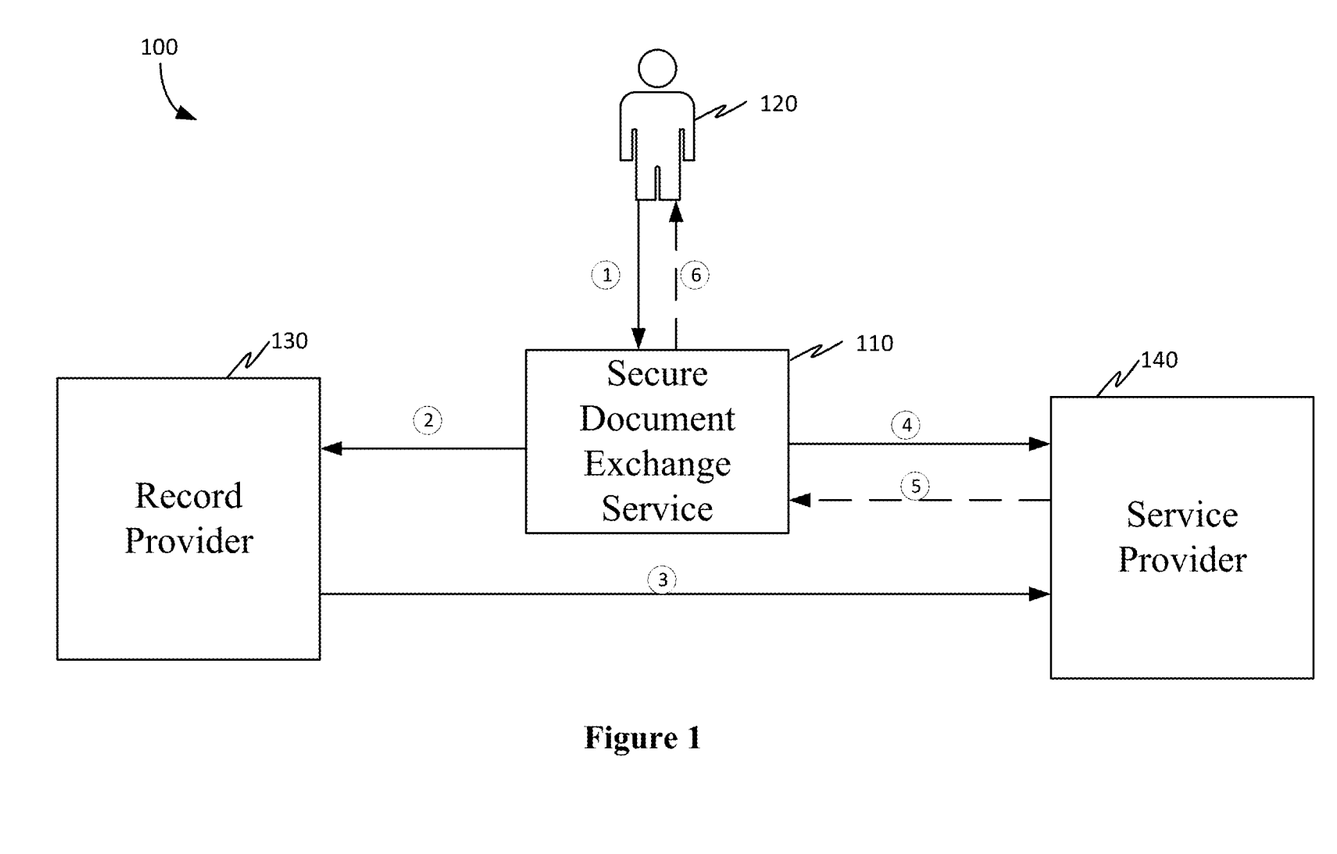
FIG. 1 illustrates an example operating environment for a secure document exchange service.
Figure 2:
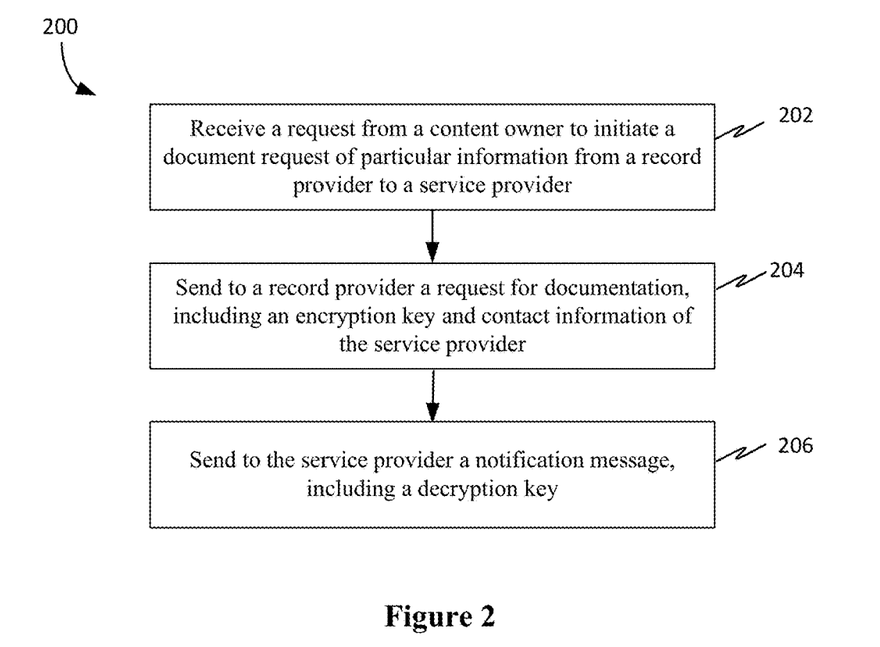
FIG. 2 illustrates a method for a secure document exchange.

FIG. 1 illustrates an example operating environment for a secure document exchange service; and FIG. 2 illustrates a method for a secure document exchange. Referring to FIG. 1, an operating environment 100 for a secure document exchange service 110 can include the secure document exchange service 110, a content owner 120, a record provider 130, and a service provider 140. The secure document exchange service 110 can assist a content owner 120 with collecting and sending information from at least one record provider 130 to a service provider 140 by performing method 200 as described with respect to FIG. 2. The secure document exchange service 110 can be implemented by a secure document exchange server such as described with respect to FIG. 6. A record provider 130 is an entity that has/stores information for or about the content owner 120. Examples of record providers include, but are not limited to, cloud storage services, financial institutions, medical offices, governmental agencies (e.g., department of motor vehicles, social security offices, etc.), schools, and other entities (business or individuals). The record provider 130 may be embodied by a computing system. A service provider 140 is an entity that receives the information from the record provider 130. In some cases, the service provider 140 uses the information received from the record provider 130 in order to perform a service on behalf of or for the content owner 120. The service provider 140 may also be embodied by a computing system.

The secure document exchange service 110 may include a registration portal for record providers and/or service providers to provide entity information such as name, address, contact information, financial account information, and document preferences. In some cases, the secure document exchange service 110 can manage a data structure mapping content owners with the record providers storing or having their information. In some cases, a service provider 140 can register forms or other information that are used by the secure document exchange service 110 to identify what information is needed by the service provider. That is, a mapping of service providers to particular information can be stored. In some of such cases, the secure document exchange service can use the data structure to identify the record providers of that information needed by the service provider. For example, when a content owner 120 requests a document exchange, the request can include information of the content owner 120 and the secure document exchange service 110 can use that information to identify the record provider 130 for the content owner 120. As another example, when a content owner 120 requests a document exchange, the request can include information of the service provider 140 and the secure document exchange service 110 can use that information to identify the particular information being requested from the record provider 130. If the record provider 130 or service provider 140 are unregistered, the content owner 120 may be required to enter information such as name, address, contact information, financial account information, and document preference when a request by the content owner is sent to the secure document exchange service 110.

The content owner 120 can request that one entity (the record provider 130) provide forms or other information to another entity (the service provider 140) via the secure document exchange service 110.

Six communications are illustrated in the operating environment 100: flow 1 from content owner 120 to the secure document exchange service 110, flow 2 from the secure document exchange service 110 to the record provider 130, flow 3 from the record provider 130 to the service provider 140, flow 4 from the secure document exchange service 110 to the service provider 140, flow 5 from the service provider 140 to the secure document exchange service 110, and flow 6 from the secure document exchange service 110 to the content owner 120.

In flow 1, the content owner 120 initiates, via the secure document exchange service 110, a document request.

Figure 6:
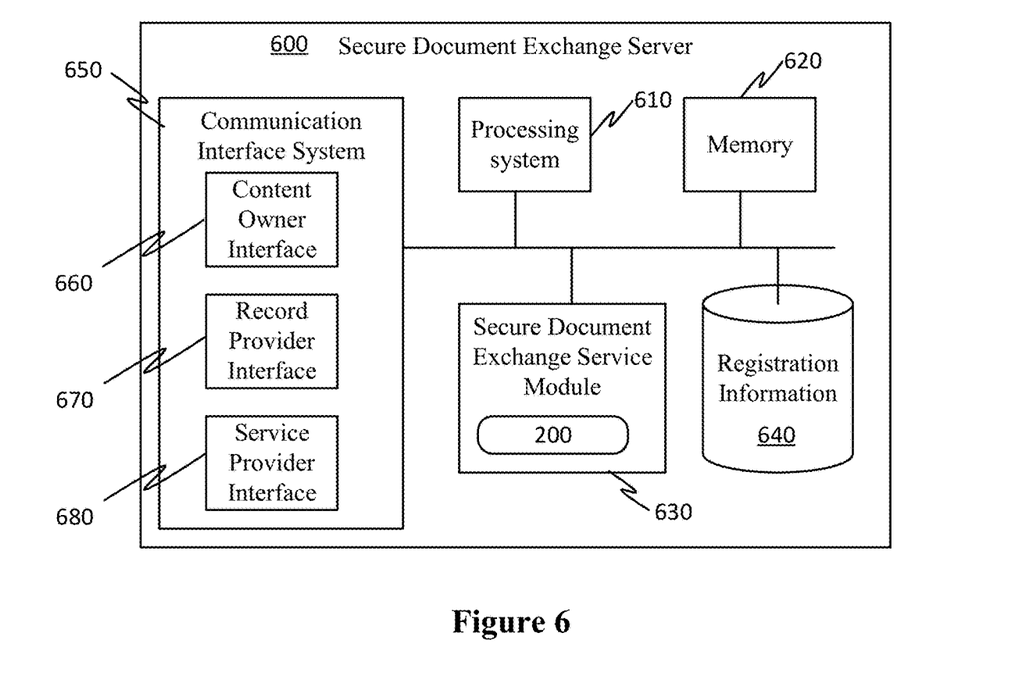
FIG. 6 illustrates a representation of a secure document exchange server for a secure document exchange service.

With reference to FIG. 2, method 200, which can be executed by a secure document exchange server hosting the secure document exchange service 110 and which may be embodied such as described with respect to FIG. 6, includes receiving (202) the request from the content owner to initiate a document request of particular information from a record provider to a service provider. The particular information can be, for example, a specified document, a form, or other file. The document request can include or indicate the content owner 120, the record provider 130, the service provider 140, and/or particular information to be sent.

In some cases, the request can be received via a graphical user interface to an application with a secure document exchange feature. The graphical user interface can include fields for entry of data and/or selection of commands, including a command to initiate a document request (which initiates a call to the secure document exchange service 110). An example interface for a content owner 120 to enter information communicated to the secure document exchange service can be seen in FIG. 4A.

In some cases, one or more of the record provider 130, the service provider 140, and particular information can be either provided or suggested to the content owner 120, by the secure document exchange service 110, based on a history of the content owner 120. For example, if the content owner 120 has requested results of a physical from a specified physician to be sent to a service provider using the secure document exchange service 110, the secure document exchange service 110 may suggest or automatically select that physician as the record provider 130.

In some cases, the document request can include just who is the content owner 120 and the service provider 140. In one such case, the secure document exchange service 110 performs a look up process to determine what particular information is needed to be sent to the service provider 140, which may have been provided as part of a registration step of the service provider 140 or stored from a previous document request by the content owner 120 or by other content owners (and if the content owner 120 has already provided information on their record providers, such information can be determined by the secure document exchange service 110 as well).

In some cases where the particular information is not included in the document request by the content owner 120, the secure document exchange service 110 may communicate with the service provider 140 to obtain information of what particular information is desired to be received. For example, if the service provider 140 requires a special or proprietary form and not a general one, the content owner 120 may not have access to it. The service provider 140 may in some cases also not directly provide the content owner 120 with exactly what particular information is needed, such as in the case of an audit.

It should be noted that there may be multiple record providers, service providers, and particular information sent as part of a single document request.

After the document request is received by the service 110, the service can begin the process of managing a secure document exchange.

In flow 2, a request for documentation can be sent to the record provider 130. With reference to FIG. 2, method 200 includes sending (204) to a record provider a request for documentation. The request for documentation can include the particular information for the record provider 130 to send to a service provider 140, contact information of the service provider 140 to receive the particular information; and an encryption key with which to encrypt the particular information. The encryption key can be generated by the secure document exchange service 110, a related service, or an external service. In some cases, the secure document exchange service communicates with the record provider via application programming interfaces made available to support the request for documentation. In some cases, the secure document exchange service communicates with the record provider via existing communication channels such as email or text messaging. In some cases, different types of communications may be used for a single request for documentation.

Returning to FIG. 1, the record provider 130 can encrypt the particular information to create encrypted particular information.

In flow 3, the encrypted particular information is sent to the service provider 140 using the contact information for the service provider 140 that was sent during flow 2 along with the request for documentation. In some cases, the record provider 130 notifies the secure document exchange service 110 that the particular information was sent to the service provider 140. At no time is the particular information needed to be stored or handled by the secure document exchange service 110.

In flow 4, the secure document exchange service 110 sends a notification message to the service provider 140. With reference to FIG. 2, method 200 includes sending (206)

to the service provider a notification message, including a decryption key. The notification message can include at least a decryption key with which to decrypt the particular information that was encrypted by the record provider 130 with the encryption key that the secure document exchange service 110 had communicated to the record provider 130. The notification message can also be used to determine particular information if not entered by the content owner 120 via the interface (and for such an embodiment, the notification message would be sent to the service provider 140 before the request for documentation is sent to the record provider 130). In FIG. 1, the notification message is shown as being sent to the service provider 140 after the document request is sent to the record provider 130. However, the notification message may be sent to the service provider 140 any time after the document request is received by the secure document exchange service 110. This includes before, simultaneously with, or after the request for documentation is sent to the record provider 130.

In flow 5, the secure document exchange service 110 may optionally receive confirmation from the service provider 140 that the documentation was received from the record provider 130. The confirmation can indicate receipt, successful decryption, or an indication that nothing further is required from the content owner 120. In the case that the indication is more than just receipt of the documentation/particular information, the confirmation can include instructions for the content owner 120 or errors that need correction.

In flow 6, after the optional confirmation from the service provider 140 that the documentation was received from the record provider 130, the service 110 can send a notification to the content owner 120 indicating that the documentation was received by the service provider 140. If instructions or errors are included in the confirmation, they can be communicated to the content owner 120 as well.

As an illustrative scenario, a first business may be seeking a partnership with a second business and needs to send the second business information about the first business. In this case, the first business is considered the content owner 120, the entity or resource storing the business information about the first business is the record provider 130, and the second business is considered the service provider 140. The first business may desire information to be sent from the record provider 130 storing information about the first business, including the first business's sales network, including manufacturers, distributors, or other entities further up on the supply chain, and other information such as customers or sales locations. The first business can initiate a document request via the secure document exchange service 110. The secure document exchange service 110 can communicate with the record provider 130 to request that particular information such as sales data, purchase data, contracts, and number of employees or locations be sent to the service provider 140 (e.g., the second business). The communication with the record provider 130 includes the encryption key. The secure document exchange service 110 communicates with the second business to provide a decryption key. Thus, when the second business receives the particular information from the record provider in a secure and trustworthy form, the second business can decrypt the information and use the information to make a determination as to whether or not to enter into a business relationship (i.e. the 'service' provided) with the first business.

Figure 3:
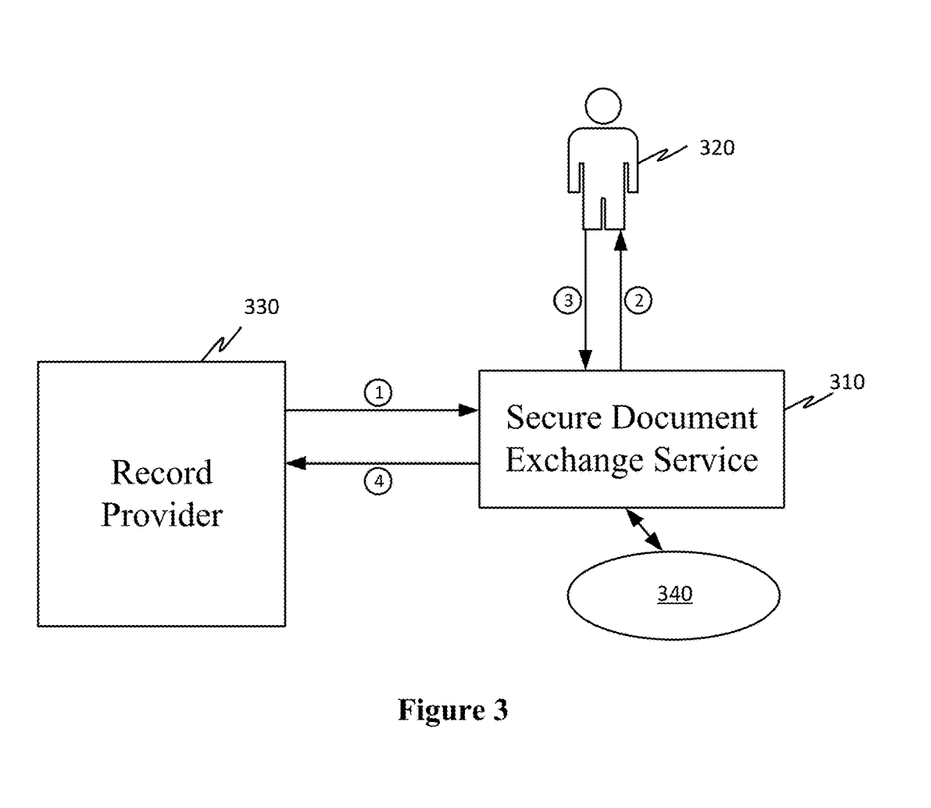
FIG. 3 illustrates a process flow for a secure document exchange service including consent management.

FIG. 3 illustrates process flow for a secure document exchange service including consent management. Referring to FIG. 3, a secure document exchange service 310 can provide consent management and obtain consent from a content owner 320 on behalf of a record provider 330 so that the record provider 330 has the appropriate consent to send information to another party (e.g., the service provider 140 of FIG. 1). Four communications are illustrated.

In flow 1, a request for consent of the content owner 320 is received by the secure document exchange service 310 from the record provider 330 for explicit consent from the content owner. The request for explicit consent can be for permitting requested particular information to be shared with a service provider (e.g., service provider 140 of FIG. 1). The request for explicit consent can include a description of the particular information that requires consent and/or any release forms required by the record provider 330.

In flow 2, the secure document exchange service 310 initiates a consent request to the content owner 320. In some cases, the consent request is sent directly by the secure document exchange service to the content owner (e.g., via an application interface for the secure document exchange service or via a communication channel such as email or text/SMS message). In some cases, the consent request is sent to the content owner via another service. The consent request can be secure or credentialed/authenticated. A process of securing or credentialing can be performed by part of the service 310 or the process can occur in a separate service associated with the service 310. That is, extra steps for authentication and security can be added to provide custom levels of security for different requests. For example, the secure document exchange service 310 can include or communicate with authentication services 340 such as provided by payment transaction services.

In flow 3, the secure document exchange service 310 receives explicit consent from the content owner 320. Although the request for consent from the record provider 330 is shown as flow 1, in some cases, the secure document exchange service 310 can obtain consent of the content owner 320 before communicating a document request to the record provider 330 (e.g., such as described in flow 2 of FIG. 1). In some of such cases, consent is requested and authenticated at the time of the content owner's initiation of a document request (e.g., the request described in flow 1 of FIG. 1). FIG. 5B illustrates an example of such a feature. This pre-request consent can be provided in situations where it is known that the record provider may require consent to share information or may be a default requirement of the secure document exchange service 310.

In flow 4, the secure document exchange service 310 sends the explicit consent to the record provider 330.

Figure 4A:
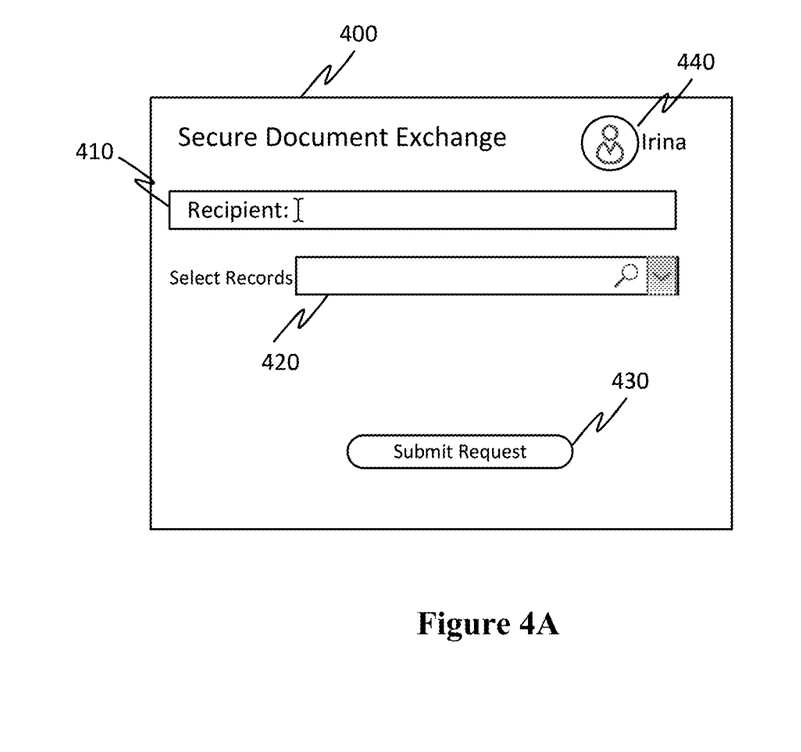
FIGS. 4A and 4B illustrate representative graphical user interfaces of an application having a secure document exchange feature.
Figure 4B:
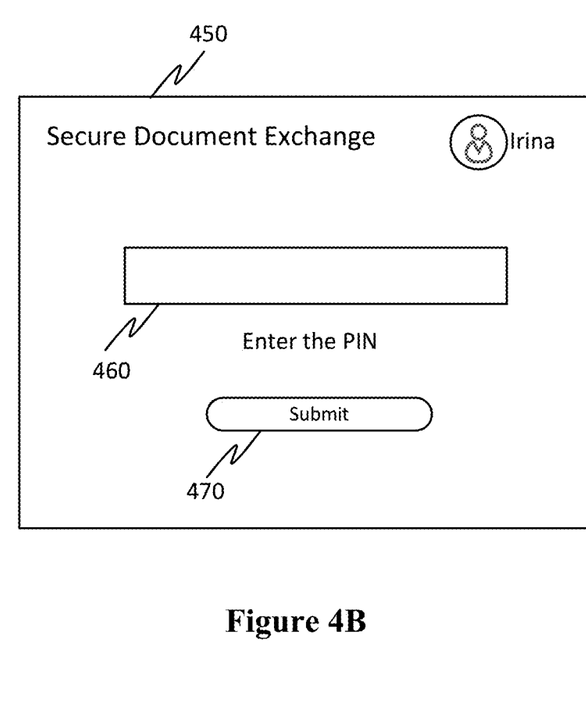

FIGS. 4A and 4B illustrate representative graphical user interfaces of an application having a secure document exchange feature. Referring to FIG. 4A, a GUI 400 of an application having a secure document exchange feature can include fields for entry of data and/or selection of commands, including a field 410 for receiving recipient information, a field 420 for selecting or entering information for the records/particular information to be sent (and optionally the record provider information), and command 430 to initiate a document request. The application having a secure document exchange feature may require a log-in of the user (e.g., reflected by the account information 440 in the graphical user interface 400). Once the user selects the command 430, the application can communicate to the secure document exchange service (e.g., via appropriate application programming interfaces) to initiate the document request; and the secure document exchange service can perform operations such as describe with respect to FIGS. 1 and 2. In some cases, such as described with respect to FIG. 3, explicit consent is needed by the record provider. The application having the secure document exchange feature may surface a screen 450 such as illustrated in FIG. 4B. Referring to FIG. 4B, a layer of authentication can be included, requiring a PIN to be entered (e.g., via field 460) and submitted (e.g., via command 470). The PIN may be part of a two-factor authentication operation.

FIGS. 5A-5E illustrate representative graphical user interfaces of a scenario for a secure document exchange. Although the illustrated scenario involves an mobile application for summer camp enrollment with secure document exchange feature, the described secure document exchange feature may be available for issuer applications, wallet applications, web pages (rendered on a web browser), and any other stand alone or embedded applications—whether on a mobile device or on some other computing device. As mentioned, the illustrated scenario is a mobile application for summer camp enrollment with secure document exchange feature and follows a parent signing up a child for a summer camp that requires a physical to be sent from a physician to the camp. The service allows the handoff from the physician to the camp to be automated (and thus out of the hands of the content owner, the parent in this case), secure, and trusted on both the parts of the physician (acting as the record provider 130 of FIG. 1) and the camp (acting as the service provider 140 of FIG. 1).

Figure 5A:
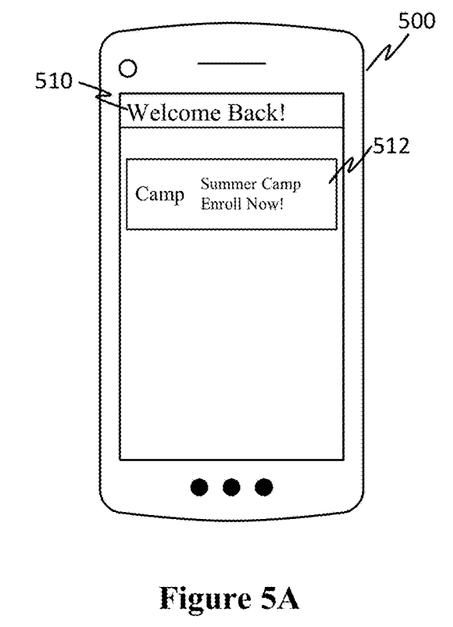
FIGS. 5A-5E illustrate representative graphical user interfaces of a scenario for a secure document exchange.
Figure 5B:
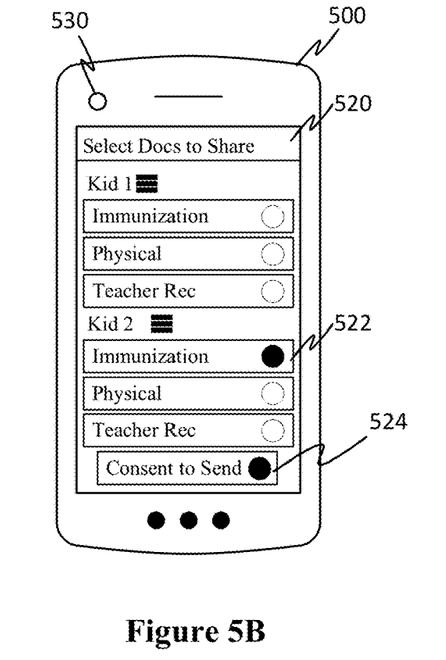

Turning to FIG. 5A, a content owner, acting as a user, can access the secure document exchange service through an application with a secure document exchange feature on a mobile device 500. Here, a graphical user interface 510 of the application can include an opening or splash page for a user to begin a process that includes a document exchange, for example by selecting command icon 512 to enroll in a summer camp.

Turning to FIG. 5B, in an example sequence for initiating the document request, a graphical user interface 520 can be surfaced for the user to indicate the particular information to include in the document request. Here, the user selects immunization records 522 of kid 2 from the options of immunization records, physical results, and teacher recommendation, and selects the command 524 for consent to send. In this implementation, the particular information to be sent is selected first and the secure document exchange service presented the information it knew to be required for the exchange. For example, the service already had determined that the particular information in general required for the summer camp is some amount of medical data for one or more children and a teacher recommendation. The secure document exchange service may have determined the particular information based on past document requests associated with the summer camp, either of the current user or other users. The summer camp can also have previously sent to the secure document exchange service particular information required for each individual registration (e.g., as part of a registration process with the secure document exchange service).

In the example scenario, the user provides consent for the record provider during the initiation of the document request. As described in FIG. 3, proactive consent may be used in cases where consent is always or almost always required, such as with medical forms. Selecting the "Consent to Send" command 524 may prompt a verification of the user. The verification can be, for example, a biometric (e.g., for facial recognition or fingerprint), a two-factor authentication, a PIN, or a security question. Here, when the user selects the command 524 for consent to send, the secure document exchange service can facilitate authentication of the user, for example, by using a facial recognition capability (and the camera 530) of the mobile device 500.

Figure 5C:
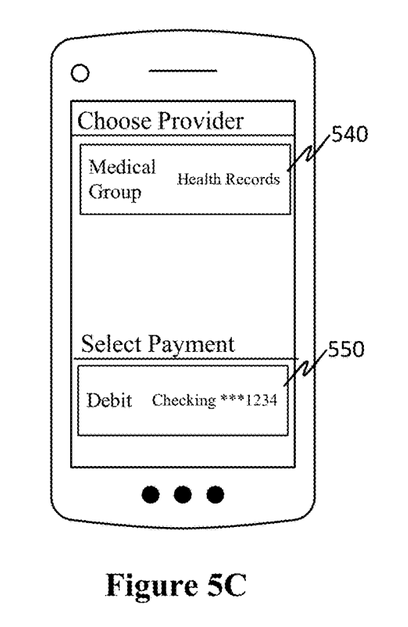

Turning to FIG. 5C, a record provider can be selected by the user. After information is entered and consent is obtained, the user can proceed to select a record provider (by selecting option 540), in this case a medical group from which to obtain medical records of the immunization records. In some cases, the application may store, or the document exchange service may provide from user history, information on the record provider for the user to select or confirm. If the record provider information is unavailable, the user may have to manually enter information about the record provider, for example, physician name and contact information. In some cases, the application includes a payment feature and the user can select to pay the camp via the application (e.g., with menu feature 550).

Figure 5D:
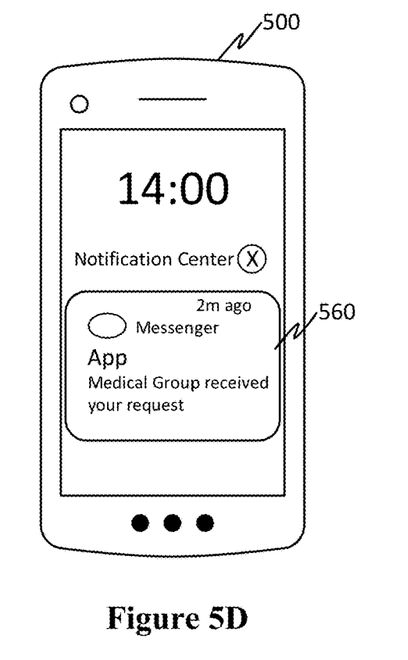

Turning to FIG. 5D, optionally, the user may receive a notification that the document request was sent to the record provider. For example, a text message may be sent from the secure document exchange service to the user's contact information, such as illustrated by the text message notice 560 surfaced by the operating system of the mobile device 500 in FIG. 5D. In some cases, the application can include a link to request consent for transfer of the records to the camp at this stage (e.g., via a link in the messenger application or by requesting the user open the app again to provide consent).

Figure 5E:
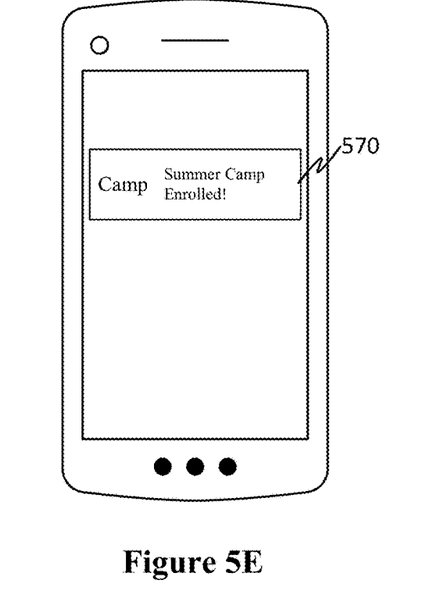

Turning to FIG. 5E, the user receives a notification 570 that the service provider (here, the camp) has received the required documentation.

FIG. 6 illustrates a representation of a secure document exchange server for a secure document exchange service. Referring to FIG. 6, a secure document exchange server 600 can include a processing system 610, memory 620, secure document service module 630, registration information storage 640 and a communication interface system 650.

The processing system 610 can include one or more processors that transform or manipulate data according to the instructions of software loaded on memory 620. Examples of types of processors of the processing system 610 include general purpose central processing units (CPUs), graphics processing units (GPUs), field programmable gate arrays (FPGAs), application specific processors, and logic devices, as well as any other type of processing device, combinations, or variations thereof.

Memory 620 can include volatile or non-volatile memory devices such as random access memory (RAM), flash, and read only memory (ROM).

Secure document service module 630 can include instructions stored on a storage device that when executed by the processing system 610 direct the server 600 to perform processes for a secure document exchange service as described herein, including method 200. The storage device of the secure document service module 630 can be any suitable computer-readable storage media. As used herein, it should be understood that in no case does "computer-readable storage media" consist of transitory media.

Registration information storage 640 stores a data structure that can map content owners with the record providers storing or having their information and further include registered record providers, registered service providers (and their forms or other information used by the secure document exchange service to identify what information is needed by the service provider. As previously mentioned with respect to FIG. 1, the secure document exchange service can use the data structure stored in the registration information storage 640 to identify the record providers of that information needed by the service provider. The registration information storage 640 is embodied by any suitable computer-readable storage media.

Communication interface system 650 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. In some cases, communication interface system 650 includes a content owner interface 660, a record provider interface 670 and a service provider interface 680. The content owner interface 660 supports communications between the secure document exchange service and an application used by a content owner. The record provider interface 670 supports communications with a record provider (e.g., the request for documentation and consent). The service provider interface 680 supports communications with a service provider (e.g., the notification message).

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method for secure document exchange, the method comprising:
   receiving, at a secure document exchange server, a request from a content owner to initiate a document request between a record provider and a service provider;
   sending by the secure document exchange server to the record provider the document request, the document request comprising at least:
      particular information, as required by the service provider, for the record provider to send to the service provider, wherein the particular information is information stored for or about the content owner by the record provider;
      contact information of the service provider; and
      an encryption key with which the record provider is to encrypt the particular information before sending to the service provider; and
   sending by the secure document exchange server to the service provider a notification message, the notification message comprising at least a decryption key with which to decrypt the particular information from the record provider.

2. The method of claim 1, further comprising:
   receiving, at the secure document exchange server, a request for explicit consent from the record provider from the content owner;
   initiating, by the secure document exchange server, a consent request from the content owner; and
   after receiving explicit consent from the content owner, sending, by the secure document exchange server, the explicit consent to the record provider.

3. The method of claim 1, further comprising:
   receiving, at the secure document exchange server, confirmation from the service provider that the particular information was received from the record provider; and
   after the confirmation from the service provider that the particular information was received from the record provider, sending, by the secure document exchange server, a notification to the content owner indicating that the particular information was received by the service provider from the record provider.

4. The method of claim 1, wherein the particular information is a specified document.

5. The method of claim 1, wherein the request from the content owner to initiate the document request comprises:
   the record provider;
   the service provider; and
   the particular information.

6. The method of claim 5, further comprising:
   providing an interface to the content owner, the interface comprising a field to enter record provider information of the record provider; and
   receiving information of the record provider or contact information for the record provider via the interface.

7. The method of claim 5, wherein the record provider is determined based on a history of the content owner.

8. The method of claim 5, further comprising:
   providing an interface to the content owner, the interface comprising a field to enter service provider information of the service provider; and
   receiving information of the service provider or contact information for the service provider via the interface.

9. The method of claim 5, wherein the service provider is determined based on history of the content owner.

10. The method of claim 5, wherein information of the particular information is provided by the content owner.

11. The method of claim 5, wherein information of the particular information is received from the service provider.

12. A non-transitory computer-readable storage medium having instructions for a secure document exchange service stored thereon that when executed perform a method for secure document exchange comprising at least:
    receiving a request from a content owner to initiate a document request between a record provider and a service provider;
    sending to the record provider the document request, the document request comprising at least:
       particular information, as required by the service provider, for the record provider to send to the service provider, wherein the particular information is information stored for or about the content owner by the record provider;
       contact information of the service provider; and
       an encryption key with which the record provider is to encrypt the particular information before sending to the service provider; and
    sending to the service provider a notification message, the notification message comprising at least a decryption key with which to decrypt the particular information from the record provider.

13. The non-transitory computer-readable storage medium of claim 12, wherein the method further comprises:
    receiving a request for explicit consent from the record provider from the content owner;
    initiating a consent request from the content owner; and
    after receiving explicit consent from the content owner, sending the explicit consent to the record provider.

14. The non-transitory computer-readable storage medium of claim 12, wherein the method further comprises:

receiving confirmation from the service provider that the particular information was received from the record provider; and after the confirmation from the service provider that the particular information was received from the record provider, sending a notification to the content owner indicating that the particular information was received by the service provider from the record provider.

15. The non-transitory computer-readable storage medium of claim 12, wherein the request from the content owner to initiate the document request comprises:

information of the content owner.

16. The non-transitory computer-readable storage medium of claim 15, wherein the request from the content owner to initiate the document request further comprises:

the service provider.

17. The non-transitory computer-readable storage medium of claim 12, wherein the request from the content owner to initiate the document request comprises:

the record provider;
the service provider; and
the particular information.

18. A secure document exchange server comprising:
one or more processors; and
a non-transitory computer-readable storage medium having instructions for a secure document exchange service stored thereon that when executed by the one or more processors direct the secure document exchange server to at least:

receive a request from a content owner to initiate a document request between a record provider and a service provider;

send to the record provider the document request, the document request comprising at least:

particular information, as required by the service provider, for the record provider to send to the service provider, wherein the particular information is information stored for or about the content owner by the record provider;

contact information of the service provider; and an encryption key with which the record provider is to encrypt the particular information before sending to the service provider; and send to the service provider a notification message, the notification message comprising at least a decryption key with which to decrypt the particular information from the record provider.

19. The secure document exchange server of claim 18, further comprising:

a registration information storage storing a data structure mapping content owners with record providers, wherein the request from the content owner comprises information of the content owner that is used to identify the record provider.

20. The secure document exchange server of claim 19, wherein the registration information storage further stores a mapping of service providers to particular information, wherein the request from the content owner comprises information of the service provider that is used to identify the particular information being requested from the record provider.

* * * * *